Jan. 31, 1950     R. E. GRIGSBY     2,496,206
HAIR WAVE PROCESSING INDICATOR
Filed Oct. 28, 1947
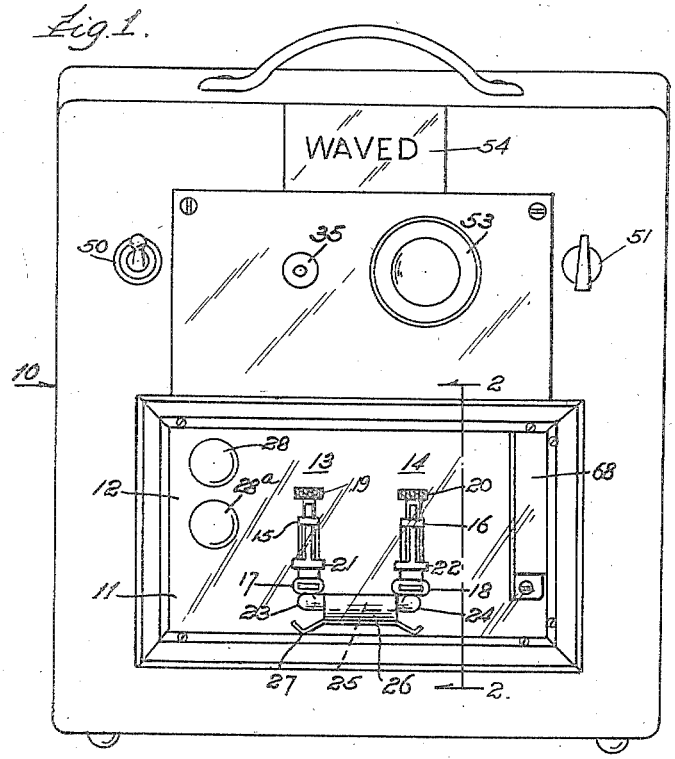
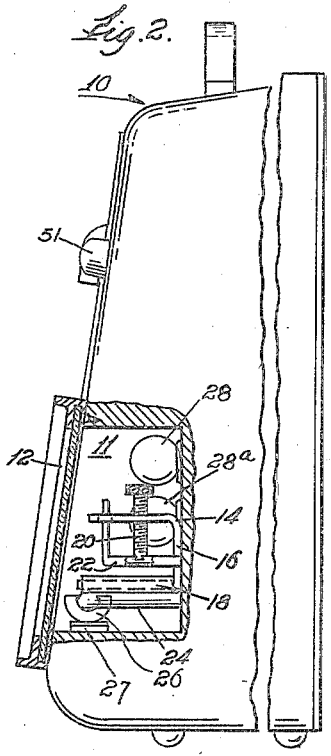
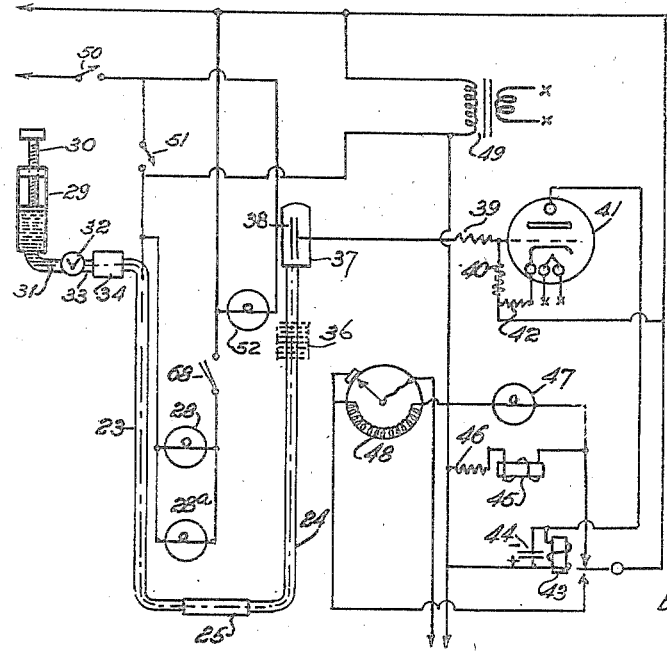
Inventor.
Robert E. Grigsby.
by McKnight and Comstock
Attorneys Patented Jan. 31, 1950

2,496,206

UNITED STATES PATENT OFFICE 2,496,206

HAIR WAVE PROCESSING INDICATOR

Robert E. Grigsby, Cincinnati, Ohio

Application October 28, 1947, Serial No. 782,502

4 Claims. (Cl. 73—160)

My invention relates to a device which indicates when human hair has been properly processed to cause a wave or curl.

It is among the objects of my invention to provide an electrically operated instrument which duplicates on a reduced scale the hair waving process and then accurately indicates when the waving process has been completed.

Further objects of my invention are to provide a means for the accurate measurement and indication of the waveability and degree of wave of human hair, and to indicate the time required to wave the hair and to assure the proper degree of curl; to eliminate the necessity of human judgment, which is subject to great error; to provide such a device in which there are no electrical contacts to the head and to provide a direct means of recording the actual physical change of the hair instead of a relative factor; to provide a means by which the manual and chemical actions of the beauty operator are duplicated remotely and on a reduced scale in an instrument simultaneously with the processing of the subject's hair; to provide visible and audible means of indicating to the operator that the hair of the subject has been sufficiently processed, and to provide an accurate indication of the porosity and/or texture of hair for other purposes, such as dyeing and heat permanent waving; to permit the operator to use such processes with a higher degree of accuracy.

My invention also comprises such further objects, advantages and capabilities as will later more fully appear, and which are inherently possessed by my invention.

Heretofore, in cold waving hair with a thioglycolic acid solution buffered with ammonia, the operator saturated the hair with the solution, rolled the hair on curlers, remoistened the hair, and then placed a cap on the head, which cap was left on until the operator determined that the hair was sufficiently waved. The method of determining whether or not the hair was waved was largely a matter of human guess work, the accuracy of which was dependent upon the experience and skill of the operator, who usually lifted the cap, unrolled one curler, and examined it for evidence of a curl by visual and sensory judgment. This method was subject to inaccuracies due to the failure of the operator to make the examination at the correct time, and due also to incorrect judgment on the part of the operator and to misleading visual indications.

Attempts have been made to solve this problem by conductivity methods in which one curl is selected, and a metal curler is used to pass a small current through the hair, which has been previously moistened with waving solution. The resistance change in the hair during the waving process is then measured by a potentiometer, the readings of which are supposed to indicate the structural change taking place in the hair. This method has not proved satisfactory because variations in the amount of solution with which the hair is saturated, or variations in the volume of hair in the curlers may cause erroneous readings. There is also frequent error in setting such devices to match the texture of the hair and its porosity or condition.

My device solves these problems through the use of an extremely sensitive membrane test cell around which is wrapped a curl of hair taken from the person whose hair is being waved. The curl is fastened at both ends and dipped in waving solution. It is maintained at body temperature and as the waving process takes place, it contracts and exerts physical pressure on the cell. This causes the closing of an electrical circuit to produce a small voltage, which is amplified. The amplified signal is then used to give visible and audible signal that the hair waving process has been completed.

While I have showed in the accompanying drawings a preferred embodiment of my invention, it is understood that the same is susceptible of modification and change without departing from the spirit of my invention.

Referring to the drawings, Fig. 1 is a front view of my hair processing indicator, Fig. 2 is a side elevational view partially in section along line 2—2 of Fig. 1, and Fig. 3 is a schematic circuit diagram of my indicator, showing all of the electrical components and conducting fluid system.

One embodiment of my invention comprises a body member 10, which houses all of the mechanical and electrical components of my indicator device. In operation, my device is connected to a suitable source of 110 volt alternating current electrical supply by means of a conventional cord and plug. Within the lower front portion of the body member 10 is a test chamber 11, the front of which is open and is surrounded by a metal framework. Slidably mounted in said framework, and attached to one side thereof is a glass cover 12.

Mounted within test chamber 11 by means of screws fastened to the back wall is a pair of clamps 13 and 14. Said clamps comprise U-shaped stationary members 15 and 16, the lower arms of which are covered by rubber jackets 17 and 18. Screws threaded through an opening in the upper arm of each of said clamps 13 and 14 are thumb screws 19 and 20, which are fastened at their lower ends to sliding cross members 21 and 22. Cross members 21 and 22 are L-shaped so that one end of the L slides along the wall portion of clamps 13 and 14 and the other end slides through an opening in the upper arm of clamps 13 and 14.

In operation, clamps 13 and 14 are controlled by rotation of thumb screws 19 and 20, which causes sliding cross members 21 and 22 to slide downwardly to contact with rubber jackets 17 and 18, which cover the stationary lower arms of clamps 13 and 14.

Positioned directly beneath the lower arms of clamps 13 and 14 are glass rods 23 and 24, which extend through holes in the back wall of test chamber 11. Slidably mounted over the ends of glass rods 23 and 24 is a U-shaped test cell 25, the center of which is composed of an extremely sensitive membranous material such as thin latex rubber, silk, pliofilm, plastic, fish bladder or any other water impervious material.

Removably mounted beneath the center portion of test cell 25 is a semi-cylindrical solution container 26, which is adapted to hold a small quantity of waving solution. The ends of solution chamber 26 are provided with smaller semi-circular openings equal in size to the diameter of the center portion of test cell 25. Solution container 26 is also provided with a support 27, which is adapted to rest on the bottom of test chamber 11 and hold solution container 26 in such a position that the center of test cell 25 is half immersed in the waving solution held within solution container 26.

Test chamber 11 has in its upper right hand corner a pair of 110 volt, 7½ watt light bulbs 28 and 28a. Said bulbs extend through openings in the rear wall of test chamber 11 and their purpose is to heat test chamber 11. Mounted on the rear wall of test chamber 11 in its upper left hand corner is thermostat 68. Thermostat 68 is set at a temperature of 98.6°, and controls the current flowing to bulbs 28 and 28a, so that the temperature of test chamber 11 is constantly maintained at 98.6°, which corresponds to the temperature of hair being waved on the head.

Referring now to the circuit diagram, Fig. 3, housed within body member 10 behind and above test chamber 11 are electrical components, which include a hydraulic system containing conducting fluid. Body member 10 has within its upper right hand corner a cylindrical reservoir 29, which holds a quantity of colored conducting fluid having a low specific gravity. In the upper part of reservoir 29 is mounted a screw type plunger 30, which is adapted to exert pressure on the fluid contained in reservoir 29.

Extending downwardly from reservoir 29 is a hollow glass outlet tube 31, which passes through a glass valve 32. Valve 32 is adapted to control the flow of conducting fluid from reservoir 29. In the opposite end of outlet tube 31 is a hollow rubber tube 33. Rubber tube 33 passes through a balancing clamp 34, which is composed of a framework holding two blocks of wood, one stationary and one movable. The movable block is connected to a screw type control 35, which extends through, and is operated from the center of the top front of body member 10.

The opposite end of rubber tube 33 is attached to one end of glass rod 23, which in turn extends into test chamber 11. At the point of juncture of rubber tube 33 and glass rod 23, a wire which leads from one side of the 110 volt electrical input is connected to the conducting fluid.

Glass rod 23 has already been described as being connected to test cell 25, which is in turn connected to glass rod 24. Glass rods 23 and 24 are preferably constructed of capillary tubing having an inner diameter of ½ to ¾ mm.

Glass rod 24 leads past a selector scale 36, which will be discussed in detail later, to a contact vessel 37. Contact vessel 37 has positioned within its center a slender steel tube 38 of 26 gauge stainless steel tubing, which tube extends into glass rod 24. When the conducting fluid reaches the bottom of steel tube 38, it establishes an electrical contact. This contact closes a circuit leading from one side of the 110 volt electric input through the conducting fluid circuit to steel tube 38. When the conducting fluid passes out the end of steel tube 38, it falls and is held within contact vessel 37. Steel tube 38 also serves to prevent the formation of air bubbles in glass rods 23 and 24.

Electrical current flows through the circuit which is closed when the conducting fluid contacts steel tube 38, and then flows through resistors 39 and 40, which are 100,000 and 70,000 ohm, 1 watt resistors respectively. The flow of current through these resistors creates a voltage drop, which is amplified by a 6J5 amplifier tube 41.

Tube 41 has a 1000 ohm, 1 watt cathode resistor 42. The plate of tube 41 is connected to a 7500 ohm relay 43 which is parallel with a 25 microfarad, 25 volt condenser 44.

An increase in the flow of current in the plate circuit of tube 41 actuates relay 43, causing it to close a circuit which leads to signaling devices. The signaling devices comprise a 110 volt buzzer 45, which is in series with a 300 ohm 25 watt resistor 46. In parallel with buzzer 45 and resistor 46 is a 110 volt 7½ watt indicator light 47.

When there is no current flowing in the circuit of amplifier tube 41, relay 43 is not activated and the circuits connected to the lower contact of relay 43 are closed. These circuits lead to a 110 volt, 1/60 R. P. M. timer 48 with a three minute cut-off, which records the amount of time consumed in waving the hair. The lower contact of relay 43 also leads to a power outlet, which may be used for a phonograph or other electrically operated device, which may be placed in operation simultaneously with my device.

My electrical circuit provides a 6.3 volt @ 1 ampere filament transformer 49, which supplies voltage for the filament of amplifier tube 41; an on-off switch 50, which is a single pole single throw toggle switch projecting from the upper left hand corner of the front of body member 10; an operating switch 51, which is a single pole single throw rotary switch to begin the hair wave timing, and which projects from the upper right hand corner of the front of body member 10; and a view light 52, which is a 110 volt 7½ watt bulb which is controlled by on-off switch 50, and which is adjacent to selector scale 36 so that said scale will be read for a proper setting of my device. My circuit also includes a heating circuit comprising two 110 volt 7½ watt bulbs 28 and 28a in parallel with each other and in series with a thermostat 68. The heating circuit is enclosed within test chamber 11 and serves to maintain it at a constant temperature of 98.6° to simulate the conditions under which hair is waved on the head.

In the upper front portion of body member 10 beside fluid control 35 is an opening into which is fitted a magnifying glass 53 of approximately 7x power. Directly behind magnifying glass 53 and visible therethrough is selector scale 36. Said scale is divided into seven zones indicated as very fine, fine, medium fine, medium, medium coarse, coarse and very coarse. Each of said zones contains three colored lines which are yellow, blue and red, reading downwardly. The seven zones are for the type of hair and the colored lines are for a loose, medium or tight wave. The bottom of selector scale 36 is positioned 1.7 mm. below the bottom end of steel tubing 37.

In the top center of the front of body member 10 is an opening 54 across which is the legend Waved. When indicator bulb 47 is lit, this legend may be clearly seen by the operator. In operation, my device is connected to a suitable source of 110 volt alternating current electrical supply. Toggle switch 50 is switched to the ON position causing view light 52 to become lit so that selector scale 36 is visible through magnifying glass 53. Glass valve 32 of the conducting fluid system is opened and plunger 30 is depressed in reservoir 29 to cause conducting fluid to flow until it is visible through magnifying glass 53.

Glass cover 12 is then slidably removed from the front of test chamber 11. Several strands of hair are cut at the scalp of the subject. The hair is wrapped around clamp 13, then around test cell 25, and then around clamp 14. Screws 19 and 20 of clamps 13 and 14 are tightened, causing cross members 21 and 22 to hold the hair firmly against rubber jackets 17 and 18. The hair is then moistened with the same thioglycolate solution which is to be used on the head.

Control 35 is then adjusted to change the pressure on balancing clamp 34 to compensate for the tension of the hair on test cell 25. Control 35 is adjusted until the end of the column of conducting fluid is visible through magnifying glass 53.

The operator then saturates the hair on the head of the subject with waving solution and wraps the curls. The operator then remoistens the hair on the head of the subject and follows this by dropping more of the waving solution on the hair which is wrapped around test cell 25. Some of this solution is permitted to remain in solution container 26, so that part of the hair is in direct contact with the solution.

The operator then turns operating switch 51 and returns to the subject to place a cap on the head of the subject. Glass cover 12 is then slid into place, closing test chamber 11. An adjustment is then made in the height of the conducting fluid by using control 35 and magnifying glass 53 to set the end of the column of fluid at the proper setting.

The proper setting of the fluid is important. The marking in each zone is determined by whether the subject desires a loose, medium or tight wave. The zones should be determined prior to the start of the wave by the use of a snap micrometer gauge which is calibrated to correspond to the seven setting of selector scale 36. This gauge is not shown in the accompanying drawings, but it may be found desirable to incorporate it within body member 10 of my device. The use of a gauge accurately calibrated in thousandths of an inch or fractions thereof eliminates inaccuracies or errors of human judgment.

After the correct setting has been made, nothing further need be done with regard to the instrument or the subject. No test curls need be checked, and no observations need be made.

The physical change which takes place in the hair on the head of the subject also takes place in the hair which is wrapped around test cell 25 of my device. The absorption of waving fluid and the waving action causes a swelling of the hair and tightening of the hair on test cell 25. This causes an increase of pressure on the conducting fluid container in test cell 25, forcing the fluid higher in capillary glass rod 24. When the hair is properly curled, the conducting fluid reaches a point where it establishes contact with steel tube 38.

This completes a circuit which permits current to flow and develop a voltage across resistors 39 and 40, which voltage is amplified by tube 41. The plate current of tube 41 then operates relay 43 causing buzzer 45 to sound and indicator light 47 to glow so that the word Waved is clearly seen through opening 54. At the same time the closing of relay 43 opens the circuit leading to the timer 48 so that the timer records the exact amount of time consumed in obtaining the wave. Relay 43 also breaks the power outlet circuit, which may lead to a phonograph or other electrically operated device. It is within the contemplation of my invention to use this outlet for a phonograph record which explains to the subject the operation of my device, or which provides soothing and entertaining music.

It should be understood that while I have shown in my preferred embodiment this particular type of circuit, yet it is understood that a balanced bridge, capacitance bridge, or photo cell circuit may be used, together with my hydraulic system, instead of the present contacting and amplifying circuit. It also may be found desirable to provide an additional selector scale to compensate for variations in the porosity or absorbency of the hair. This scale would be provided on capillary glass rod 24 and would be similar in construction and operation to selector scale 36.

Having thus described my invention, I claim:

1. A hair wave processing indicator comprising a casing having closed top, bottom, side and front walls, said front wall having a window portion adapted to be opened and closed, said casing having a hollow interior, top, bottom, rear and side walls within the front portion of the hollow interior of said casing forming with said window portion a test chamber, the rear wall of said chamber adapted to act as a support, a pair of spaced hair clamps mounted on the rear wall of said chamber, a pair of spaced capillary tubes extending forwardly from the hollow interior of said casing through the rear wall of said chamber into said chamber, said tubes positioned below said hair clamps, a thin membranous test cell attached to said ends of said tubes and extending between said tubes, a reservoir containing a fluid capable of conducting electrical current positioned within the hollow interior of said casing, a glass outlet valve positioned beneath said reservoir and connected therewith, said valve adapted to permit the flow of fluid from said reservoir, a rubber tube connected at one end to said valve, a clamp having jaws surrounding said rubber tube, means for controlling the closing of said jaws from the exterior of said casing to control the flow of fluid through said rubber tube, the other end of said rubber tube connected to one of said capillary tubes, said fluid adapted to flow through said first capillary tube, said test cell and said second capillary tube, said hair clamps adapted to hold the ends of a lock of hair which is wrapped around said test cell, said test cell adapted upon tightening of said lock of hair to cause said fluid to rise in said second capillary tube, electrical contacts positioned at opposite ends of said capillary tubes and included in an electrical circuit, said fluid adapted upon rising to the end of said second tube to close said electrical circuit through said fluid including a vacuum tube amplifier, an electrical signaling device operated by the output of said amplifier and means for connecting said indicator to a suitable source of electrical supply.

2. A hair wave processing indicator comprising a casing having a hollow interior, the front of said casing having a window portion adapted to be opened and closed, walls within the front portion of the hollow interior of said casing forming with said window portion a test chamber, a pair of spaced hair clamps mounted on one wall of said test chamber, a pair of spaced capillary tubes extending from the hollow interior of said casing into said test chamber, said tubes positioned adjacent to said hair clamps, a thin membranous test cell attached to the forward end of said tubes and extending between said tubes, a reservoir containing a fluid capable of conducting electrical current positioned within the hollow interior of said casing, a connection leading from said reservoir to one of said capillary tubes, means for controlling the flow of fluid from said reservoir to said tube, said fluid adapted to flow through said first capillary tube, test cell and second capillary tube, said hair clamps adapted to hold the ends of a lock of hair which is wrapped around said test cell, said test cell adapted upon tightening of said lock of hair to cause said fluid to rise in said second capillary tube, electrical contacts positioned at opposite ends of said tubes and included in an electrical circuit, said fluid adapted upon rising in said second tube to close said electrical circuit, a signalling device operated upon the closing of said electrical circuit and means for connecting said indicator to a suitable source of electrical supply.

3. In a hair wave processing indicator, a thin membranous test cell containing a fluid, a capillary tube connected to said test cell, retaining means adjacent said test cell for holding the ends of a lock of hair which is wrapped around said test cell, said test cell adapted upon tightening of said lock of hair to cause said fluid to rise in said capillary tube.

4. A hair wave processing indicator comprising a casing, a thin membranous test cell containing a fluid positioned within said casing, a capillary tube connected to said test cell, retaining means adjacent said test cell for holding the ends of a lock of hair which is wrapped around said test cell, said test cell adapted upon tightening of said lock of hair to cause said fluid to rise in said capillary tube to operate a signaling device.

ROBERT E. GRIGSBY.

No references cited.